United States Patent [19]

Kirk

[11] 4,003,630

[45] Jan. 18, 1977

[54] BICYCLE SAFETY REFLECTOR

[76] Inventor: Norbert A. Kirk, 43 E. Ohio St., Room 930, Chicago, Ill. 60611

[22] Filed: Oct. 11, 1974

[21] Appl. No.: 514,270

[52] U.S. Cl. .................................. 350/99; 350/97; 301/37 SA
[51] Int. Cl.² .......................................... G02B 5/12
[58] Field of Search ................. 350/99, 293, 6, 97, 350/102, 98, 104; 301/37 R, 37 SR, 37, 37 SA; 224/30 R; 46/174, 178, 179; 116/158; 340/405

[56] References Cited

UNITED STATES PATENTS

| 1,708,459 | 4/1929 | Wood | 350/97 |
| 2,434,516 | 1/1948 | Persons et al. | 46/174 |
| 2,741,948 | 4/1956 | Parker | 350/99 |
| 3,310,357 | 3/1967 | Hogan | 301/37 SA |
| 3,722,841 | 3/1923 | Ciolfi | 224/30.5 |
| 3,758,190 | 5/1972 | Douglas | 350/99 |
| 3,854,777 | 12/1974 | Kennedy | 301/37 R |

*Primary Examiner*—John K. Corbin
*Assistant Examiner*—B. Wm. de los Reyes
*Attorney, Agent, or Firm*—Larson, Taylor and Hinds

[57] ABSTRACT

A safety reflector device for a bicycle includes a shaft member secured to a bicycle in an upright position adjacent the side of a wheel. A reflective member is mounted for free rotation on the shaft adjacent the side of the wheel. The device includes a wheel engaging member, preferably the reflective member itself, which engages the wheel. Rotation of the bicycle wheel thus is caused to induce rotation of the reflector. In one embodiment, the wheel engaging member engages the tire and in another embodiment, it engages the wheel spokes. Various reflective members may be used and may include highly visible flickering or moving effects.

14 Claims, 4 Drawing Figures

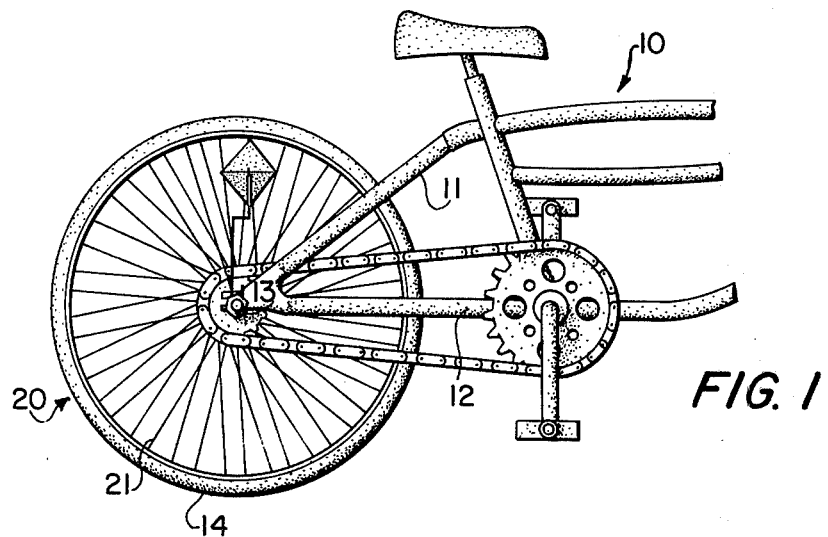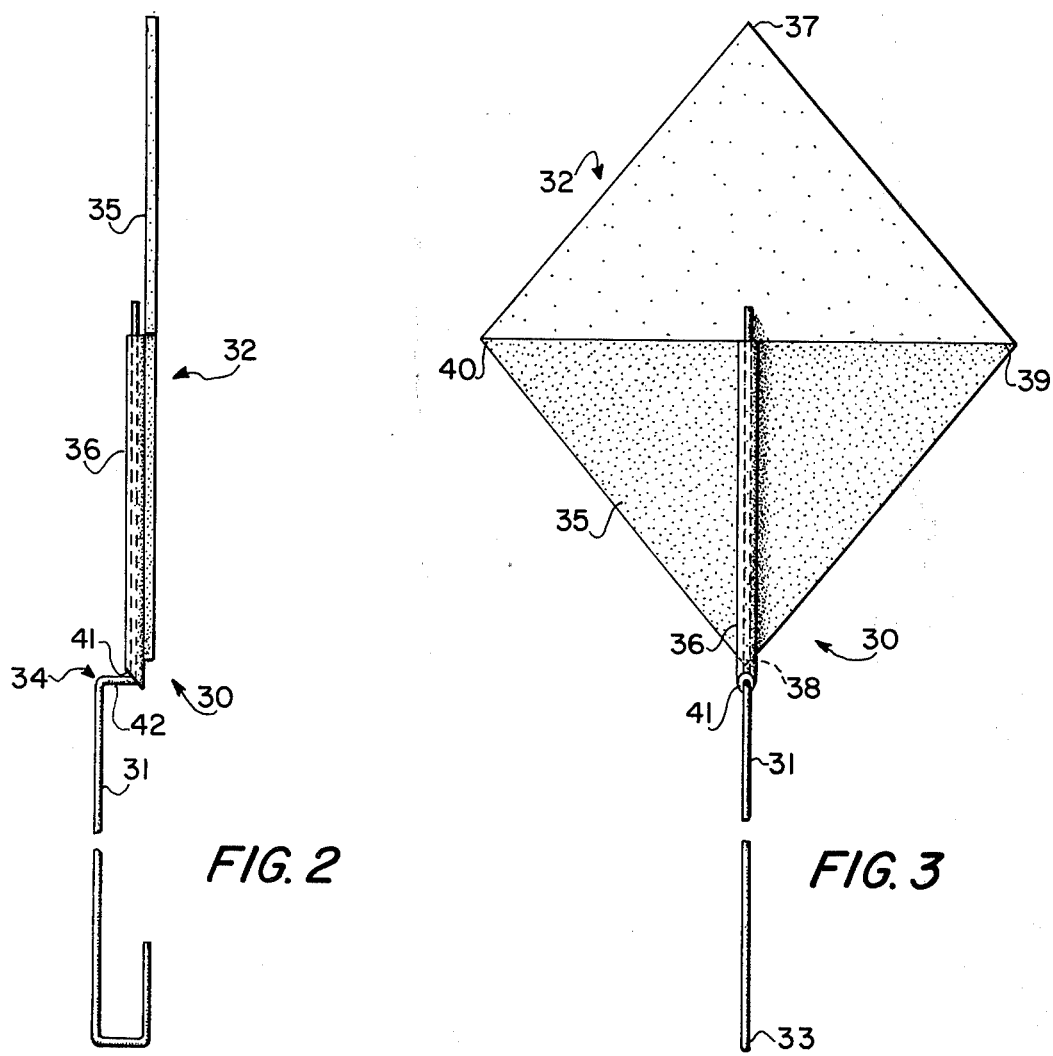

BICYCLE SAFETY REFLECTOR

BACKGROUND OF THE INVENTION

The present invention relates to safety reflectors for bicycles.

There are several known safety reflector devices for bicycles. One type is rigidly fixed to the bicycle and others are moveable relative to the bicycle. The latter type offer enhanced visibility but are often heavy and expensive.

It is an object of the present invention to provide a bicycle safety reflector of the moveable type having a rotatable reflective member. It is a further object to provide such a device which is light weight and inexpensive. It is yet a further object to provide such a device which is reliable and not fragile. It is a further object to provide such a device having a very wide field of view so as to be observed by a viewer located at various wide angles with respect to the bicycle.

BRIEF SUMMARY OF THE INVENTION

The foregoing and other objects which will be apparent to those having ordinary skill in the art are achieved according to the present invention by providing a safety reflector device for a bicycle having spoked wheels, the device including a shaft member, means for securing the shaft member to the bicycle in an upstanding position adjacent a side of the bicycle wheel, a reflective member rotatably mounted for free rotation on the shaft member adjacent the side of the wheel, and a wheel engaging member which, upon being engaged by a revolving bicycle wheel, induces rotation of the reflective member.

DETAILED DESCRIPTION

There follows a detailed description of several embodiments including the drawings in which:

FIG. 1 is a side elevation view of the rear portion of a bicycle including a safety reflector device according to the invention.

FIG. 2 is a side elevation view of the safety reflector device of FIG. 1.

FIG. 3 is a front elevation view of the safety reflector device of FIG. 2.

Figure 4:
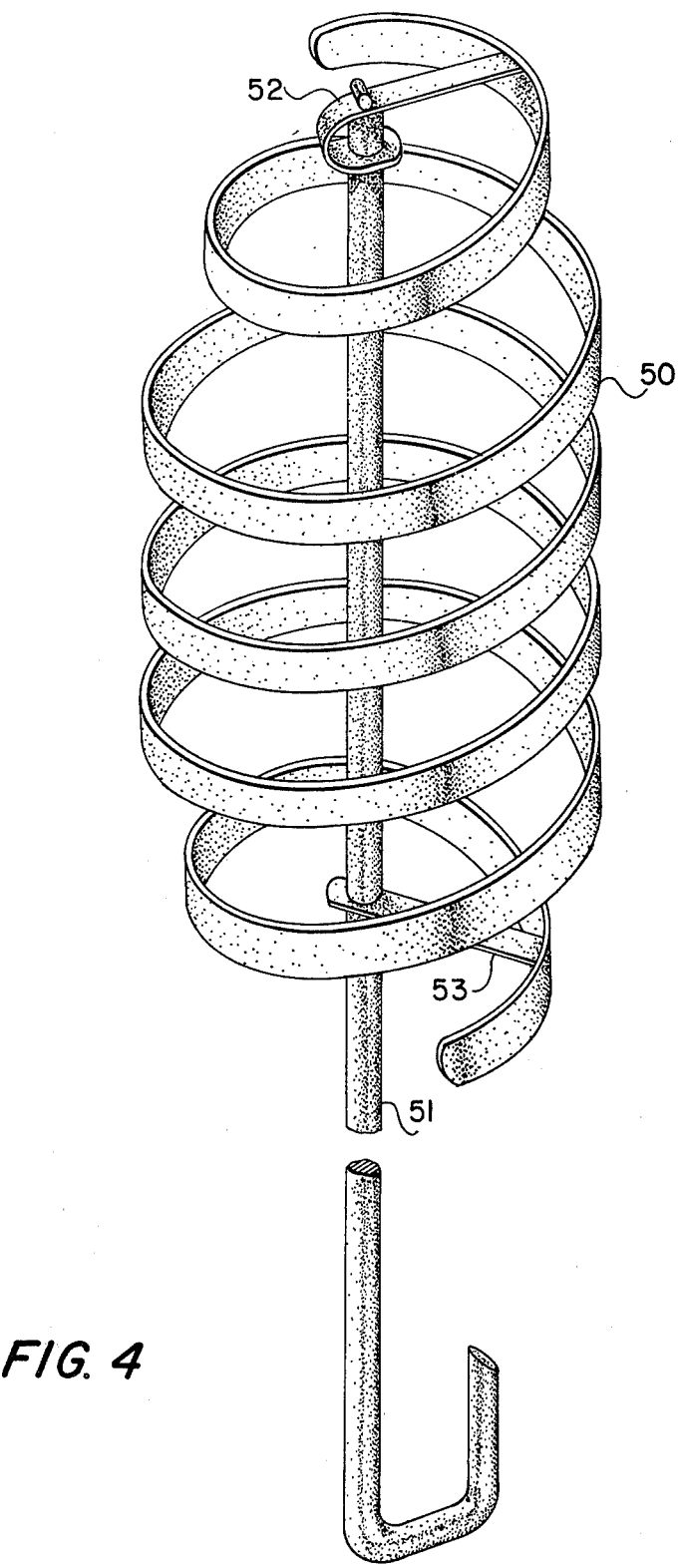
FIG. 4 is an elevation view of an alternative safety reflector device according to the invention.

The embodiment shown in detail in FIGS. 2 and 3 is shown in FIG. 1 mounted adjacent the side of rear wheel 20 of bicycle 10. The bicycle is conventional and includes, on each side of the bicycle, conventional main frame members 11 and 12 which terminate in a rear portion adapted to receive the rear wheel axle. A nut 13 secures the wheel to the bicycle frame. The nut also secures the safety reflector device 30 to the bicycle.

The safety reflector device includes a shaft member 31 and a reflective member 32 rotatably mounted for free rotation about the shaft member. The lower end of shaft 31 includes a bent U-shaped portion 33 sized to fit around the rear bicycle axle. Nut 13 and a washer are used to secure the safety reflector device to the bicycle such that the shaft member 31 is secured in an upstanding position adjacent the side of the bicycle wheel. The shaft is bent at a point intermediate its ends to form a stop 34 which supports reflective member 32. Reflective member 32 includes a diamond shaped reflective sheet or plate 35 secured to a tubular member 36 which receives the upper portion of shaft member 31. Plate 35 is preferably fabricated from any rigid light weight material such as plastic, paper/resin laminate, cloth/resin laminate, or the like and includes conventional reflective materials such as tape, paint, or the like. By "reflective" is meant all of the conventional safety reflective materials including those intended to be seen in daylight or at night.

Plate 35 is oriented symmetrically about tubular member 36 and its axis of rotation with points 37 and 38 in alignment with the axis of rotation and with points 39 and 40 located diametrically opposite. The device is positioned such that, during rotation of reflective member 32 on shaft member 31, a portion of the device is engaged by bicycle wheel 20 to cause rotation of reflective member 32. In this embodiment, the device is positioned such that the portions of plate 32 at points 39 and 40 enter into the path of rotation of spokes 21 of wheel 20 when reflective member 32 is rotated. Thus, when the bicycle is moving with the reflector device in the position shown, the moving spokes will intermittently engage the outer extremities 39, 40 of reflective member 32 causing it to spin on shaft 31. This provides a highly visible reflective device which is extremely light weight and inexpensive and yet reliable and not fragile. Moreover, the device requires no special mounting means and the reflective member is easily replaced simply by lifting the reflective member up off shaft member 31. Several of these reflective members are easily stored in a repair kit or the like thus making it possible for the rider to select the best type of reflector device for the prevailing conditions (night, daylight, fog, etc.).

It is preferable to position the reflective member adjacent the side of the spokes so that it will be visible, through the spokes, to an observer on the remote side of the bicycle. The reflector thus has wide angle visibility to observers located at various angles relative to the bicycle. It will be clear that the lower portion of shaft member 31 can be secured by means of a conventional axle nut at virtually any location to achieve this purpose. Shaft 31 may be simply straight or may include a plurality of bent portions 34, one above the other, to permit vertical adjustment of the position of reflective member 32. This also provides an adjustment in the rotation of member 32 since, at any given bicycle speed, the linear velocity of a spoke as it touches member 32, is greater away from the bicycle axle. Accordingly, rotation speed is greater when member 32 is located radially outward of the axle and slower when located nearer the axle.

The device thus far described will not spin, of course, unless it is engaged by a revolving spoke. The reflective member is free to rotate and it will not necessarily align itself in position to be so engaged. However, under most circumstances, normal bouncing or wind effects or the like will cause the reflective member 32 to move sufficiently to be engaged by spokes 21. In those rare instances where such motion is not induced, the rider may simply flick the device which is conveniently done with a foot. It is preferable, however, to include in the device means to cause the reflective member to adopt a spoke engaging position when the bicycle is at rest. This can be done in any of several ways, one of which is shown most clearly in FIGS. 2 and 3.

Reflective member 32 is supported on stop 34 on shaft 31. The lower end 41 of tubular member 36 bears on a horizontal portion 42 of shaft member 31. The lower end 41 of tube 36 is truncated at an acute angle with respect to shaft member 31 such that reflective member 32 is rotationally biased into a predetermined rest position. This rest position is chosen such that, when the device is in position adjacent the bicycle wheel, a spoke engaging portion of reflector member 32 is in the rotational path of the spokes. This feature provides the additional advantage, where the reflector is planar, that the reflector is visible from the rear when the bicycle is stationary.

In a preferred form, reflective member 32 is provided with areas of differing reflectivity to cause a "flickering" effect which is highly visible. For example, the upper half of one face of place 32 may be reflective and the lower half non-reflective. The upper half of the other face is non-reflective and the lower half is reflective. This provides a pronounced flickering effect in an up and down direction during rotation.

The reflective member 32 can also take other shapes such as cylindrical, helical, oval, or the like. In such devices, a portion of the device is adapted to engage the spokes. For example, a helical device such as shown in FIG. 4 may be employed. In that event, the device would additionally include a member for engaging the spokes. This could take the form of a separate member adapted for the purpose or it could take the form of a plurality of arms extending outwardly from the helical member shown, these arms extending into the rotational path of the spokes.

In the alternative embodiment shown in FIG. 4, the reflective member is a helical strip member 50 rotatably mounted on shaft member 51. Shaft member 51 mounts on the bicycle using nut 13 in the same manner as shaft member 31. Helical strip member 50 is provided on both of its surfaces with reflective material and, on rotation, presents a highly visible and unusual reflective surface. Strip member 51 is mounted for rotation on shaft 51 by a pair of arms 52, 53, arm 52 also supporting member 51 longitudinally on shaft 51. As in the case of reflective member 32 (FIGS. 1-3) reflective member 50 is preferably easily removed, by simple lifting off shaft 51 in this embodiment, for replacement.

When mounted on the bicycle, the outer surface of a portion of helical reflective strip member 50 is contacted by tire 14 to cause rotation of the reflective member. The turns of the helix are preferably sufficiently close at this area that the device is in constant engagement with the tire. If the turns of the helical strip are so wide that constant contact with the bicycle tire is not achieved, rotation may be induced in the same manner as in the embodiment of FIGS. 1-3.

In the illustrated embodiments, rotation of the reflective member is induced by contacting the reflective member itself with the bicycle wheel. While this is preferred for simplicity and lightness in weight, such rotation may also be induced by including a wheel or the like mounted for rotation by the wheel tire, spokes, or the like. The rotation of the wheel is then used to rotate the reflective member.

It is a distinct advantage of the invention that it is adaptable without special or expensive tools or fittings. The bicycle frame includes portions, such as nut 13, for easily positioning the shaft member in an upright position. Some bicycles, in fact, include a member in substantially upright position which can easily accommodate the reflector device of the present invention. One such ready made shaft member is the conventional safety flag staff. These staffs are quite long and are frequently attached to the rear frame adjacent the side of the bicycle wheel. A reflective member according to the invention can be easily mounted for rotation on the staff at a portion adjacent the sides of the bicycle wheel for engagement with the wheel.

It is preferred that the shaft supporting the member be light weight and flexible. For this reason, it is preferred to mount the shaft at one end only, leaving the other end free to oscillate. This flexible type of mounting acts as a shock absorber and prolongs the life of the device.

What is claimed is:

1. A safety reflector device for a bicycle having spoked wheels, said safety reflector device comprising:
   a shaft member;
   a reflective member mounted on a first end of said shaft member for revolving rotation thereon through a full 360°; and
   means for mounting said shaft member in a position adjacent to a side of a wheel of a bicycle with the reflective member on said shaft member positioned adjacent the side of said wheel such that a revolving wheel engages said reflective member to effect rotation of said reflective member about said shaft member through 360° so that opposite edges of said reflective member are alternately brought into contact with the spokes of the wheel thereby providing 360° visibility of the reflective member, said mounting means comprising means for mounting the other end of said shaft at least in proximity to the rotational axis of said wheel so that said shaft member extends radially outwardly from said rotational axis.

2. A safety reflector according to claim 1 wherein said reflective member includes areas of differing reflectivity such that, on rotation thereof, a highly visible flickering effect is induced.

3. A safety reflector device according to claim 1 including means for biasing said reflective member into a rest position with reflective member extended into said path of said spokes when the bicycle wheel is stationary such that when the reflective member is stationary, said reflective member is in position to be engaged by said spokes.

4. A safety reflector device according to claim 1 wherein said shaft member includes a stop located intermediate the ends of said shaft member, said device including a tubular member fixed to said reflector member and positioned on the portion of said shaft above said stop for revolving about said shaft, the lower end of said tubular member being truncated at an acute angle and forming a sloped surface engaging with said stop such that the reflective member is biased into a pre-determined rest position with the spoke-engaging portion of said reflective member in position to be engaged by said spokes upon revolving of said wheel.

5. A safety reflector device according to claim 1 wherein said reflective member is removeably mounted on said shaft.

6. A safety reflector device according to claim 5 including a plurality of interchangeable reflective members.

7. A safety reflector device according to claim 1 wherein said reflective member includes areas of differing reflectivity such that, on rotation thereof, a highly visible flickering effect is induced.

8. A safety reflector device for a bicycle having spoked wheels, said safety reflector device comprising:
- a shaft member including a stop intermediate the ends thereof;
- a substantially planar reflective member mounted on a first end of said shaft member for revolving rotation thereon through a full 360°;
- means for mounting said shaft member in a position adjacent to a side of a wheel of a bicycle with the reflective member on said shaft member positioned adjacent the side of said wheel such that a revolving wheel engages said reflective member to effect rotation of said reflective member about said shaft member through 360° so that opposite edges of said reflective member are alternately brought into contact with the spokes of the wheel thereby providing 360° visibility of the reflective member, said mounting means comprising means for mounting the other end of said shaft at least in proximity to the rotational axis of said wheel so that said shaft member extends radially outwardly from said rotational axis; and
- a tubular member affixed to said reflective member and disposed on said shaft member above said stop for rotation about said shaft, said tubular member including an inclined end portion in engagement with said stop for biasing said reflective member into a position wherein said reflective member is engaged by said revolving wheel during rotation of the latter.

9. A safety reflector device according to claim 8 wherein said planar reflective member is symmetrical about said shaft member.

10. A safety reflector device according to claim 9 wherein said planar member is diamond shaped.

11. In a combination, a bicycle having spoked wheels, and a safety reflector device, said safety reflector device comprising:
- a shaft member;
- a substantially planar reflective member mounted on a first end of said shaft member in symmetrical relationship thereto for revolving rotation thereon through a full 360°; and
- means for mounting said shaft member in a position adjacent to a side of a wheel of a bicycle with the reflective member on said shaft member positioned adjacent the side of said wheel such that a revolving wheel engages said reflective member to effect rotation of said reflective member about said shaft member through 360° so that opposite edges of said reflective members are alternately brought into contact with the spokes of the wheel thereby providing 360° visibility of the reflective member, said mounting means comprising means for mounting the other end of said shaft at least in proximity to the rotational axis of said wheel so that said shaft member extends vertically from said rotational axis.

12. The combination of claim 11 wherein said safety reflector device includes a stop located intermediate the ends of said shaft member, said device including a tubular member fixed to said reflector member and positioned on the portion of said shaft above said stop for revolving about said shaft, the lower end of said tubular member being truncated at an acute angle and forming a sloped surface engaging with said stop such that the reflective member is biased into a pre-determined rest position with the spoke-engaging portion of said reflective member in position to be engaged by said spokes upon revolving of said wheel.

13. The combination of claim 12 wherein said reflective member comprises a diamond shaped member.

14. A safety reflector device for a bicycle having spoked wheels, said safety reflector device comprising:
- a shaft member;
- a reflective member mounted on a said shaft member for revolving rotation thereon through a full 360°; said reflective member comprising a helical strip member which extends around said shaft member, the opposed surfaces of said strip member having reflective areas; and
- means for mounting said shaft member in a position adjacent to a side of a wheel of a bicycle with the reflective member on said shaft member positioned adjacent the side of said wheel such that the tire of a revolving wheel engages an outer portion of said reflective member to effect rotation of said reflective member about said shaft member through 360° thereby providing 360° visibility of the reflective member.

* * * * *